United States Patent
Verchere et al.

(10) Patent No.: US 7,835,286 B2
(45) Date of Patent: Nov. 16, 2010

(54) DYNAMIC MULTI-OBJECTIVE GRID RESOURCES ACCESS

(75) Inventors: Dominique Verchere, Breuillet (FR); Sabine Randriamasy, Meudon (FR); Dohy Hong, Fontenay sous Bois (FR)

(73) Assignee: Alcatel Lucent, Paris (FR)

( * ) Notice: Subject to any disclaimer, the term of this patent is extended or adjusted under 35 U.S.C. 154(b) by 271 days.

(21) Appl. No.: 12/007,508

(22) Filed: Jan. 11, 2008

(65) Prior Publication Data
US 2009/0180388 A1    Jul. 16, 2009

(51) Int. Cl.
- G01R 31/08 (2006.01)
- H04J 1/16 (2006.01)
- H04L 1/00 (2006.01)
- G06F 15/16 (2006.01)
- G06F 15/173 (2006.01)

(52) U.S. Cl. .......... 370/238; 709/201; 709/226
(58) Field of Classification Search .......... 370/218, 370/401, 238, 389; 709/226, 201; 707/999.003, 707/999.204
See application file for complete search history.

(56) References Cited

U.S. PATENT DOCUMENTS

| | | | |
|---|---|---|---|
| 7,124,062 B2 * | 10/2006 | Gebhart | 702/186 |
| 7,379,967 B2 * | 5/2008 | Izutsu et al. | 709/204 |
| 7,584,226 B2 * | 9/2009 | Fatula et al. | 1/1 |
| 2005/0144283 A1 * | 6/2005 | Fatula, Jr. | 709/226 |
| 2006/0265436 A1 * | 11/2006 | Edmond et al. | 707/204 |
| 2007/0250489 A1 * | 10/2007 | Bao et al. | 707/3 |
| 2007/0294408 A1 * | 12/2007 | Jackson | 709/226 |
| 2008/0253281 A1 * | 10/2008 | Li et al. | 370/218 |
| 2008/0306866 A1 * | 12/2008 | Fellenstein et al. | 705/37 |
| 2009/0034418 A1 * | 2/2009 | Flammer et al. | 370/238 |
| 2009/0240547 A1 * | 9/2009 | Fellenstein et al. | 705/8 |
| 2009/0313229 A1 * | 12/2009 | Fellenstein et al. | 707/3 |

* cited by examiner

*Primary Examiner*—Ayaz R Sheikh
*Assistant Examiner*—Hoang-Chuong Q Vu
(74) *Attorney, Agent, or Firm*—Kramer & Amado P.C.

(57) ABSTRACT

Various exemplary embodiments are a method and apparatus for selecting an access solution in a Grid network including one or more of the following: receiving an application request, the application request having an associated application cost; identifying a plurality of Grid endpoints for which the application cost is not more than an amount of available resources at each of the plurality of Grid endpoints; computing, for each of the plurality of Grid endpoints, a lowest cost path to access the Grid endpoint; and selecting, as the access solution, a first Grid endpoint of the plurality of Grid endpoints. Various exemplary embodiments are a method of selecting aback-up access solution in a Grid network including one or more of the following: ordering a first plurality of couples according to one or more metrics; determining a strategy; and calculating a share of resource load for each couple in the strategy.

24 Claims, 6 Drawing Sheets

DYNAMIC MULTI-OBJECTIVE GRID RESOURCES ACCESS

BACKGROUND OF THE INVENTION

1. Field of the Invention

This invention relates generally to selection and access of resources in a computer network.

2. Description of Related Art

As modern companies' reliance on computers has increased, the demands placed on computers and computer networks have also increased. Many companies desire to run massive computational applications for which the computing power or storage capability of a single machine would be insufficient. For example, financial services companies often run risk and portfolio analysis applications in which enormous data sets are analyzed. Similar problems arise in numerous other fields, including scientific research, manufacturing, computer graphics, and energy. For many companies, it is cost-prohibitive to purchase and maintain a sufficient amount of processing power and storage to solve these problems.

Grid computing, sometimes referred to as utility computing, provides a solution to these problems by providing computer resources and infrastructure management as required by the customer. When a customer submits a job to the utility computing network for execution, the service provider distributes computational load throughout the Grid network. Existing systems, however, fail to optimally distribute the load to maximize the use of resources, while minimizing associated costs.

Accordingly, there is a need for a Grid resource server access strategy that selects the most suitable Grid resources, while also optimizing the usage of network resources. More particularly, there is a need for an access strategy that considers resources related to computation, storage, visualization, acquisition, and web applications. Additionally, there is a need for a Grid resource server access strategy that is state-aware, such that it maintains network and computation performance even in the event of resource shortages.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations, and improvements herein shown and described in various exemplary embodiments.

SUMMARY OF THE INVENTION

In various current embodiments, the routing mechanisms deployed by Grid network operators do not use any information from the Grid server endpoints, as the Internet was not initially designed to integrate this information. Sending data and requests across the network infrastructure is therefore inherently inefficient and, as a result, the network infrastructure cannot deliver the required performance for large-scale distributed applications. Accordingly, in current embodiments, customers of network operators are unable to outsource their Information Technology resource servers to centralized data centers.

Many of the problems in these current embodiments arise due to the limited capabilities of the standard routing protocols used by network backbones. These protocols include Open Shortest Path First (OSPF) protocol with Traffic Engineering (TE) extension, used for intra-domain routing, and Border Gateway Protocol (BGP), used for inter-domain routing. Because the Internet was designed for shared networks to deliver best effort network service when routing application data traffic, standard transport protocols typically fail to consider performance requirements of the Grid Application at the user and server sides. Thus, when computing and selecting routes for application data, current routing protocols fail to consider information from Grid Application users that affect congestion, packet loss, and latency. In addition, when calculating network routes, these protocols consider only link capacities and network traffic load, while failing to consider the capacity and load of Grid server endpoints, such as computational, storage, visualization, and acquisition resources. In addition, these protocols fail to consider other application service parameters related to the Grid server endpoints, including performance parameters, class of services, service multiplexing, service security, and numerous other parameters.

In various current embodiments, enterprises purchase multiple network services from multiple network operators. These multi-homing configurations provide redundancy through different network operators in an attempt to provide guaranteed network service availability. However, these embodiments do not provide 100% Grid and network service availability. In addition, these embodiments can cause a routing conflict when accessing edge-resource servers. Because there are multiple different network operators, there are multiple paths from the origin to Grid server endpoints. Furthermore, as described above, there is currently no way to intelligently select a route based on cost and end-to-end performance. Accordingly, network operators do not always deliver Grid applications to companies via the most advantageous paths and Grid server endpoints.

In light of the present need for a Grid resource server access strategy, a brief summary of various exemplary embodiments is presented. Some simplifications and omissions may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

Various exemplary embodiments provide a dynamic multi-objective Grid resources access (DMGA) strategy. Thus, various exemplary embodiments determine a costumer needs-aware access strategy to Grid resources that selects server endpoints and the routes to access them by considering resource capacity, resource availability, and the current network state. In various exemplary embodiments, this information is gathered from edge-resource servers.

Thus, various exemplary embodiments generate a strategy, or optimal set of solution couples, $S=\{(E, P(E))\}$, where E is a Grid endpoint and $P(E)$ is the best path to access that endpoint. Given a Grid application request, various exemplary embodiments search in the Grid network for the optimal strategy for Grid resource usage and access the determined resource to perform the application workflow. In the event of resources shortage, whether at the network links or at the endpoints, various exemplary embodiments provide a back-up solution that can either restore the service and maintain performance, or provide an alternate service strategy. Thus, in various exemplary embodiments, secondary routes are computed and selected for protection in the event of network failure, Grid application server failures, and resource unavailability set by the Grid network management.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
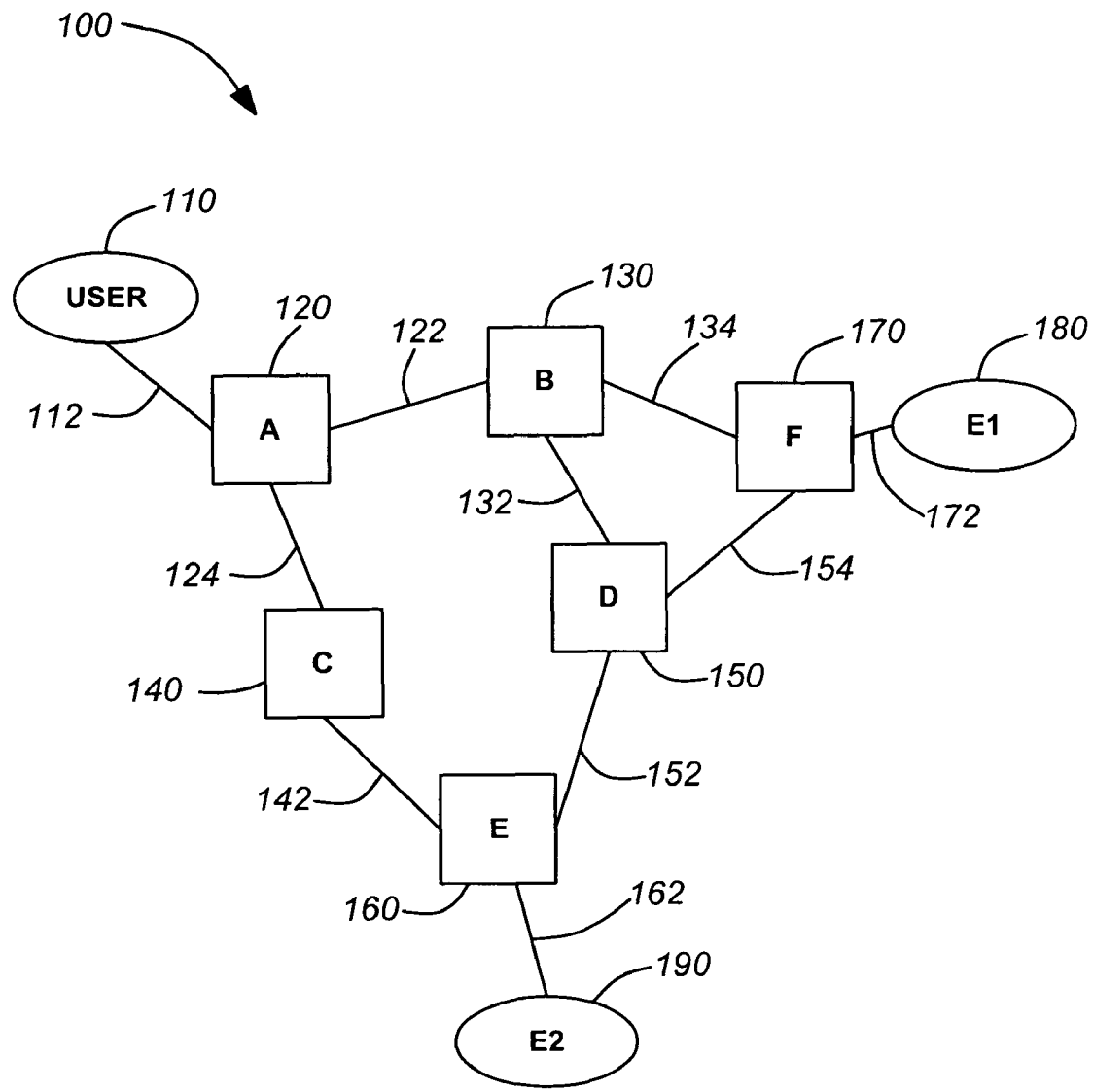
FIG. 1 is a schematic diagram of an exemplary embodiment of a Grid network.

Referring now to the drawings, in which like numerals refer to like components or steps, there are disclosed broad aspects of various exemplary embodiments.

FIG. 1 is a schematic diagram of an exemplary embodiment of an exemplary Grid network 100. Exemplary Grid network 100 includes Grid user endpoint 110, User-A link 112, Node A 120, A-B link 122, A-C link 124, Node B 130, B-D link 132, B-F link 134, Node C 140, C-E link 142, Node D 150, D-E link 152, D-F link 154, Node E 160, E-E2 link 162, Node F 170, F-E1 link 172, Grid server endpoint E1 180, and Grid server endpoint E2 190.

In various exemplary embodiments, Grid user endpoint 110 is a system located at a company site that access resources located at a Grid server endpoint 180, 190. Thus, in various exemplary embodiments, Grid user endpoint 110 is a combination of software and hardware that enables a user to submit computational or storage tasks for execution at Grid server endpoints 180, 190.

In various exemplary embodiments, Node A 120, Node B 130, Node C 140, Node D 150, Node E 160, and Node F 170 are network elements. As depicted in FIG. 1, Node A 120, Node E 160, and Node F 170 are edge nodes, while Node B 130, Node C 140, and Node D 150 are core nodes. It should be apparent that, in various exemplary embodiments, these nodes comprise telecommunications hardware suitable for receiving and forwarding requests and data between Grid user endpoint 110 and Grid server endpoints 180, 190.

In various exemplary embodiments, Grid server endpoint E1 180 and Grid server endpoint E2 190 are servers that contain Grid resources and are connected to one or more nodes via a data link. Accordingly, in various exemplary embodiments, Grid server endpoints 180, 190 comprise a significant amount of storage and/or computational power suitable for storing data and executing tasks received from Grid user endpoint 110. Additionally, in various exemplary embodiments, Grid server endpoints 180, 190 comprise visualization resources, such as a screen or display, or acquisition resources, such as measurement equipment including telescopes, colliders, and other equipment used in research. In various exemplary embodiments, Grid server endpoints 180, 190 also comprise specific and complex software applications that are accessible through the transport network. Furthermore, in various exemplary embodiments Grid server endpoints 180, 190 comprise a cluster of two or more computers suitable for providing Grid resources as a single unit.

Although illustrated with one Grid user endpoint 110, six nodes 120, 130, 140, 150, 160, 170, and two Grid server endpoints 180, 190, it should be apparent that, in various exemplary embodiments, exemplary Grid network 100 includes nearly any different number of user endpoints, nodes, and/or server endpoints according to nearly infinite possibilities of combinations. Moreover, it should be apparent that, in various exemplary embodiments, exemplary Grid network 100 includes additional links between nodes and endpoints.

Figure 2:
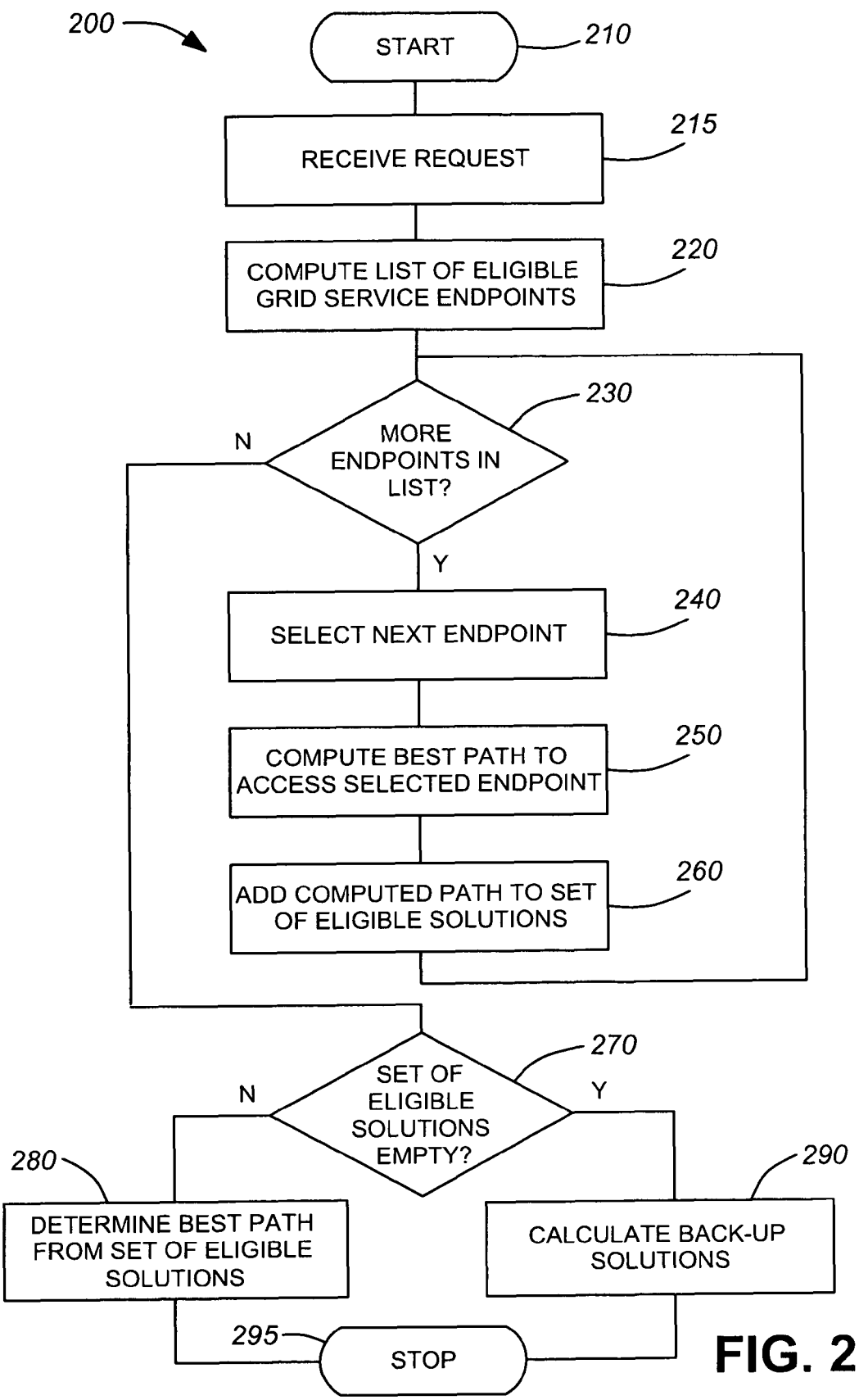
FIG. 2 is a flowchart of an exemplary embodiment of a method of selecting an access solution in a Grid network.

FIG. 2 is a flowchart of an exemplary embodiment of a method 200 of selecting an access solution in a Grid network 100. Exemplary method 200 executes a series of steps to generate a strategy, or optimal set of solution couples, $S=\{(E, P(E))\}$, where E is a Grid endpoint and $P(E)$ is the best path to access that endpoint. In various exemplary embodiments, each couple, $(E, P(E))$, is valued according to three metrics: $R(E)$ is the amount of available resources at the endpoint; $CP(E)$ is the cost of the network path to access the endpoint; and $CR(A)$ is the cost of the Grid application workflow, A, evaluated in terms of Grid resources plus the application software component itself.

It should be apparent that, in various exemplary embodiments, exemplary method 200 is executed by any network element that comprises a routing function and a database containing Grid state information and network state information. In various exemplary embodiments, this database includes information regarding the state of the viewed network, including, but not limited to, available link bandwidth, availability, transit delay, topology, linked endpoints, jitter, and billing supports. In various exemplary embodiments, the database also includes information regarding available resources at each of the Grid endpoints. Furthermore, in various exemplary embodiments, network state information is flooded periodically in the network with a suitable network routing protocol engine, such as Open Shortest Path First-Traffic Engineering (OSPF-TE), thereby updating the state information stored in the database.

Exemplary method 200 starts in step 210 and proceeds to step 215, where the network element receives a request from a Grid user that is associated with the network element. Alternatively, in various exemplary embodiments, a service management entity (SRV) receives the request from a Grid user. In such embodiments, the SRV gathers information from the Grid Application in order to compute the required Grid resources and related cost, $CR(A)$. The SRV then formats this information for processing by a DMGA module located in the router controller or in an external component system associated with the Grid user endpoint. In addition, in various exemplary embodiments, the SRV manages the scheduling parameters, such as time and duration, for the Grid Application workflows and the network sessions.

After receiving the request, exemplary method 200 proceeds to step 220, where a list of eligible Grid service endpoints is computed. In various exemplary embodiments, exemplary method 200 generates the list of eligible Grid service endpoints by determining all endpoints E with resources, $R(E)$, that can satisfy the cost of the application workflow, CR(A). In various exemplary embodiments, when the endpoint is a data center offering utility storage, R(E) is evaluated by considering at least one of storage capacity, storage protocol interfaces (e.g. Internet Small Computer System Interface (iSCSI), Fibre Channel over IP (FCIP), Internet Fibre Channel Protocol (iFCP), Redundant Array of Independent Disks (RAID), and Serial/Parallel Advanced Technology Attachment (ATA)), and storage structures.

After computing the list of eligible Grid service endpoints, exemplary method 200 proceeds to step 230, where exemplary method determines whether there are more endpoints to be examined in the list of eligible Grid service endpoints. When, in step 230, it is determined that there are more Grid service endpoints to be examined, exemplary method 200 proceeds to step 240, where the next endpoint in the list of eligible Grid service endpoints is selected for examination.

Exemplary method 200 then proceeds to step 250, where the best path to access the selected Grid service endpoint is determined. In various exemplary embodiments, the best path is the path with the lowest cost, CP(E). In various exemplary embodiments, the cost function CP(E) is based on a set of one or more criteria relating to network resources, such as path length, administrative cost, bandwidth, and theoretical or actual transit delay. It should be apparent that, in various exemplary embodiments, CP(E) is calculated by attributing different weights to each of the one or more criteria.

After determining the best path in step 250, exemplary method 200 proceeds to step 260, where the currently selected Grid service endpoint and the best path for the endpoint are added to a set of eligible solutions as a couple. Exemplary method 200 then returns to step 230, where it is determined whether there are more endpoints to be examined in the list of eligible Grid service endpoints.

When, in step 230, it is determined that there are no more endpoints to be examined, exemplary method 200 proceeds to step 270, where it is determined whether the set of eligible solutions is empty. When the set of eligible solutions is not empty, exemplary method 200 proceeds to step 280, where the best path is determined from the set of eligible solutions. In various exemplary embodiments, the best path from this set is the couple (E, P(E)), where P(E) is the lowest cost path from the set of eligible solutions and E is the corresponding Grid server endpoint. After determining the best path, exemplary method 200 proceeds to step 295, where exemplary method 200 stops.

When, in step 270, it is determined that the set of eligible solutions is empty, there is no accessible endpoint that has sufficient Grid resources and network resources required for the Grid application workflow. Accordingly, exemplary method 200 proceeds to step 290, where back-up solutions are calculated, as described further below with reference to FIGS. 3-6. After calculating back-up solutions, exemplary method 200 proceeds to step 295, where exemplary method 200 stops.

In the description of FIGS. 3-6 that follows, it should be understood that, in various exemplary embodiments, a resource such as an endpoint or network link is said to be "critical" if its load exceeds a threshold defined by the Grid network management or operator. In other words, criticality of an endpoint or link may occur due to excessive load or a violation of one of the thresholds set by the network management.

Furthermore, in various exemplary embodiments, each of the back-up mechanisms detailed with respect to FIGS. 3-6 has one or more of the following characteristics. In various exemplary embodiments, the back-up mechanisms are aware of resource availability at link and Grid endpoints, thereby allowing consideration of these values in computing back-up paths and endpoints. Additionally, in various exemplary embodiments, the back-up mechanisms utilize multiple network criteria such as length, available bandwidth, delay, administrative cost, and packet loss. In various exemplary embodiments, these network criteria are gathered in a weighted vector, thereby allowing a different weight to be attributed to each of the network criterion.

In various exemplary embodiments, the choice of selection metrics for the endpoints and paths and the associated weights is performed by Grid network management according to its current policies. In various exemplary embodiments, link metrics for deviation paths include at least the path length and the available link bandwidth. Moreover, in various exemplary embodiments, the constraints dictated by the Grid network management are enforced through prior filtering on the network states and endpoint server states and/or post-filtering on the set of extracted strategies.

Figure 3:
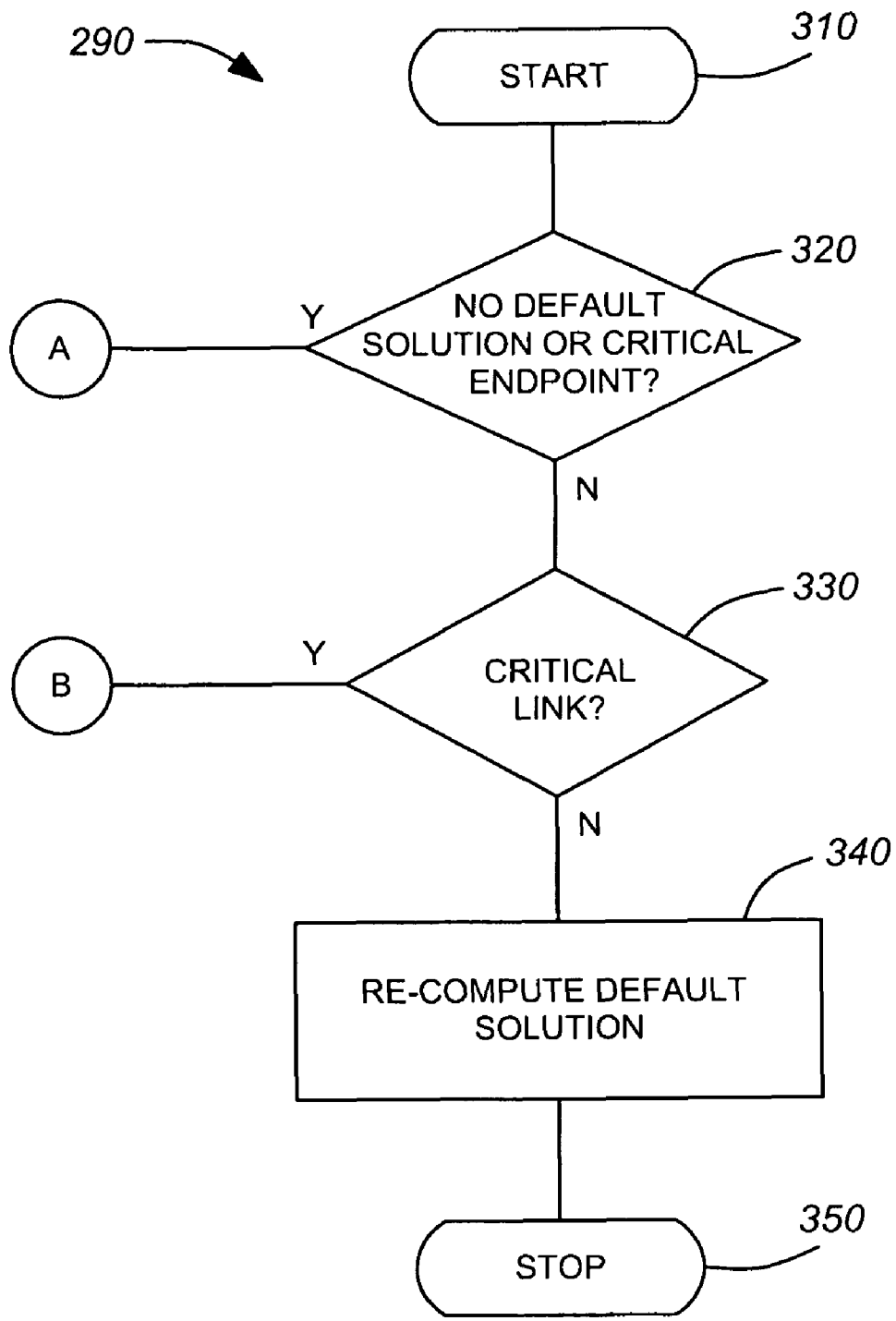
FIG. 3 is a flowchart of an exemplary embodiment of a method of calculating a back-up access solution in a Grid network for use in connection with the method of FIG. 2.

FIG. 3 is a flowchart of an exemplary embodiment of a method 290 of calculating a back-up access solution in a Grid network 100 for use in connection with step 290 of exemplary method 200. It should be apparent that, although illustrated as a step in exemplary method 200, execution of exemplary method 290 is not limited to instances where the set of eligible solutions is empty in step 270 of FIG. 2. Accordingly, in various exemplary embodiments, exemplary method 290 begins execution in response to criticality or failure at a network link, Grid user endpoint, or Grid server endpoint.

Exemplary method 290 starts in step 310 and proceeds to step 320. In step 320, it is determined whether the reason for execution of the back-up procedure is due to failure to calculate a default solution, which occurs when there is no eligible Grid server endpoint, or due to criticality of an endpoint.

Figure 4:
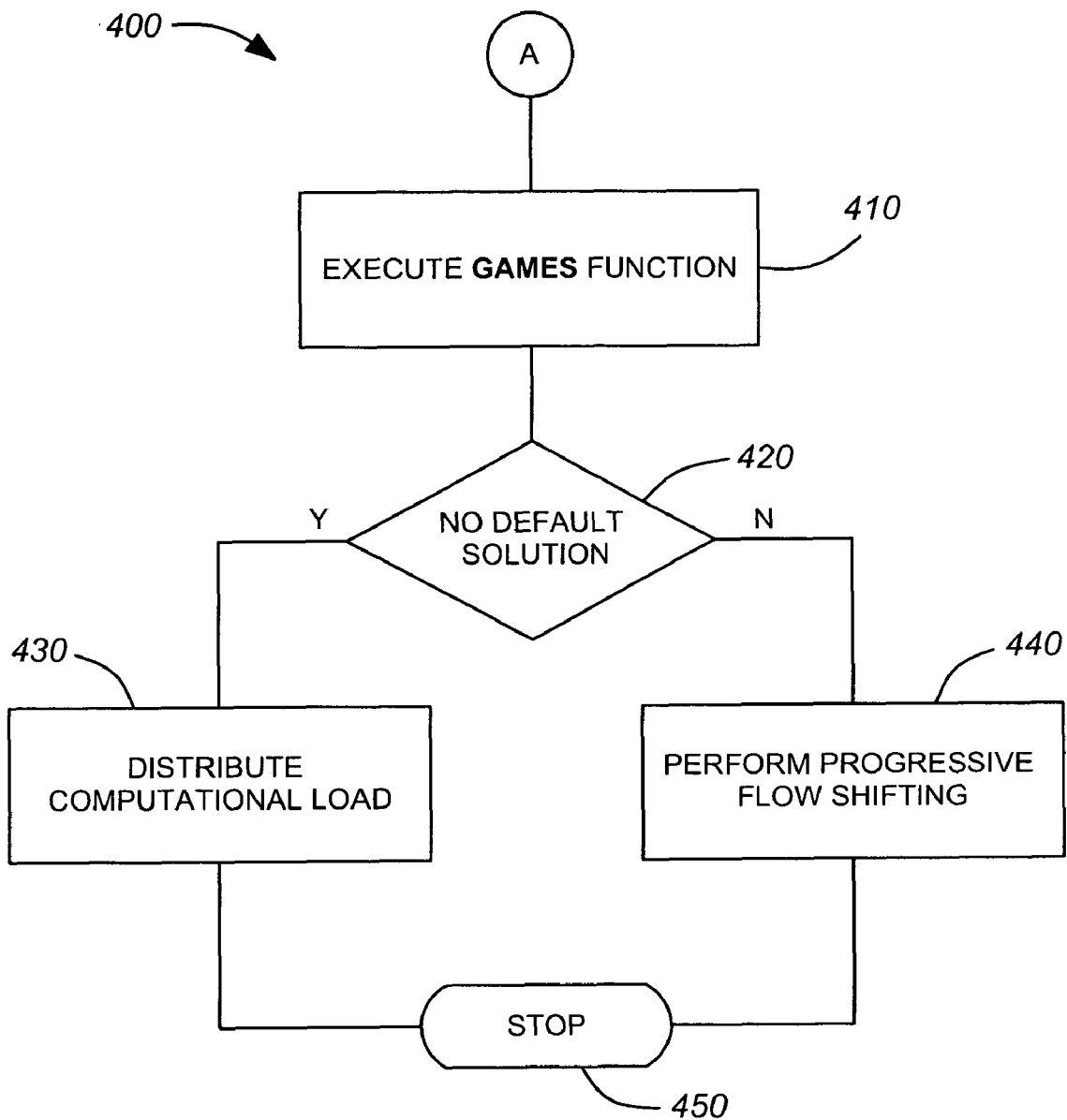
FIG. 4 is a flowchart of an exemplary embodiment of a method of calculating a back-up access solution based on lack of resources or criticality at an endpoint in connection with the method of FIG. 3.

When, in step 320, it is determined that there is no default solution or that there is a critical endpoint, exemplary method proceeds to FIG. 4. When, in step 320, the reason for execution of the back-up procedure is not criticality of an endpoint or lack of a default solution, exemplary method 290 proceeds to step 330.

In step 330, it is determined whether the reason for execution of the back-up procedure is criticality of a network link. When, in step 330, it is determined that a network link is critical, exemplary method 290 proceeds to FIG. 6.

When, in step 330, it is determined that there are no critical network links, exemplary method 290 determines, by process of elimination, that the reason for execution of the back-up solution is failure of an endpoint or link. Then, exemplary method 290 proceeds to step 340, where a default solution is re-computed and implemented. Exemplary method 290 next proceeds to step 350, where exemplary method 290 stops.

FIG. 4 is a flowchart of an exemplary embodiment of a method 400 of calculating a back-up access solution based on lack of resources or criticality at an endpoint. When a determination is made that there is no default solution or that there is a critical endpoint in step 320 of exemplary method 290, as described above with reference to FIG. 3, execution proceeds to step 410 of exemplary method 400.

In step 410, a Grid Application-Driven Multi-Endpoints Strategy (GAMES) function is executed, as described in further detail below in connection with FIG. 5. Step 410 returns a strategy, S, including several endpoints, $E_A$, and their associated least cost paths, $P(E_A)$. Accordingly, in various exemplary embodiments, the strategy can be expressed as a set of multiple endpoints and multiple paths, $S=\{(E_A, P(E_A))\}$. Moreover, in various exemplary embodiments, each couple $(E_A, P(E_A))$ has a value reflecting the amount of the computational load, storage load, or other type of load the endpoint will manage. After receiving the results from the GAMES function, exemplary method 400 proceeds to step 420.

In step 420, a determination is made whether the reason for execution of exemplary method 400 is the lack of a default solution. When it is determined in step 420 that the reason for execution of exemplary method 400 is the lack of a default solution, exemplary method 400 proceeds to step 430, where the computational load is distributed among the solutions $(E_A, P(E_A))$ according to the shares calculated by the GAMES function. Exemplary method 400 then proceeds to step 450, where exemplary method 400 stops.

When, in step 420, it is determined that the reason for execution of exemplary method 400 is not the lack of a default solution (i.e. there is a critical endpoint), exemplary method 400 proceeds to step 440. In step 440, progressive flow shifting is performed until the Grid endpoint is no longer critical. Thus, in various exemplary embodiments, traffic is deviated away from the endpoint specified in the default solution towards the endpoints specified in the back-up solution set S until the Grid endpoint's status is not critical. After restoring the Grid endpoint to non-critical status, exemplary method 400 proceeds to step 450, where exemplary method 400 stops.

Figure 5:
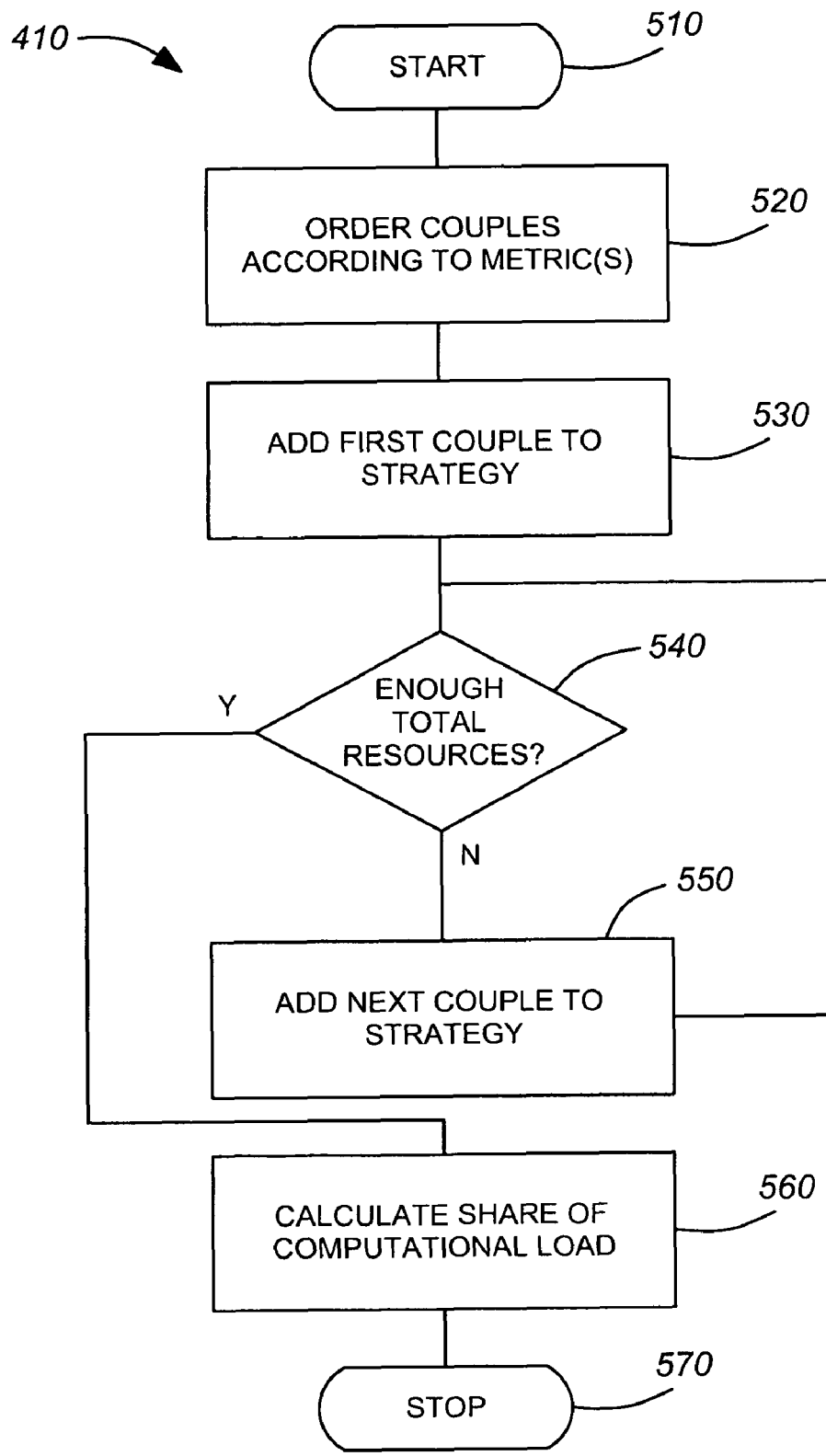
FIG. 5 is a flowchart of an exemplary embodiment of a method of executing a Grid Application-Driven Multi-Endpoints Strategy for use in connection with the method of FIG. 4.

FIG. 5 is a flowchart of an exemplary embodiment of a method 410 of executing a GAMES function for use in connection with method 400 as described above in connection with FIG. 4. In various exemplary embodiments, the GAMES function provides a back-up strategy that involves multiple endpoints and multiple paths, where each path accesses an endpoint.

Exemplary method 410 starts in step 510 and proceeds to step 520, where the couples of endpoints and paths, (E, P(E)), are ordered according to one or more metrics. Thus, in various exemplary embodiments, the couples are ordered according to the cost of the Grid resources at the endpoint, CR(E), and the cost of the network path to access the endpoint, CP(E). In various exemplary embodiments, the one or more metrics are weighted according to the Grid network and application management policies.

After ordering the couples, (E, P(E)), exemplary method 410 proceeds to step 530, where the couple $(E_1, P(E_1))$ with the highest performance value is added to a strategy, S. Exemplary method 410 then proceeds to step 540, where it is determined whether the set of endpoints in the strategy S provides sufficient network resources and Grid resources.

When, in step 540, it is determined that the strategy S does not provide sufficient network and Grid resources for execution of the task, exemplary method 410 proceeds to step 550. In step 550, the couple $(E_{i+1}, P(E_{i+1}))$ with the next highest performance value is added to the strategy. Exemplary method 410 then returns to step 540, where it is determined whether the strategy S now contains a sufficient amount of resources for execution of the task.

When, in step 540, it is determined that the strategy S provides sufficient resources, exemplary method 410 proceeds to step 560, where the share of computation load for each endpoint is calculated proportionately to its performance value. Thus, in various exemplary embodiments, the percentage of computation load for each endpoint, $E_i$, is the performance value of $E_i$ divided by the total of all performance values. Exemplary method 410 then proceeds to step 570, where exemplary method 410 stops.

Accordingly, in various exemplary embodiments, exemplary method 410 continues to add endpoints to strategy S until the total amount of resources in the strategy is sufficient for execution of the task. Upon completion, exemplary method 410 returns a set of multiple endpoints and paths, $S=\{E_A, P(E_A)\}$, and an associated load for each couple.

Figure 6:
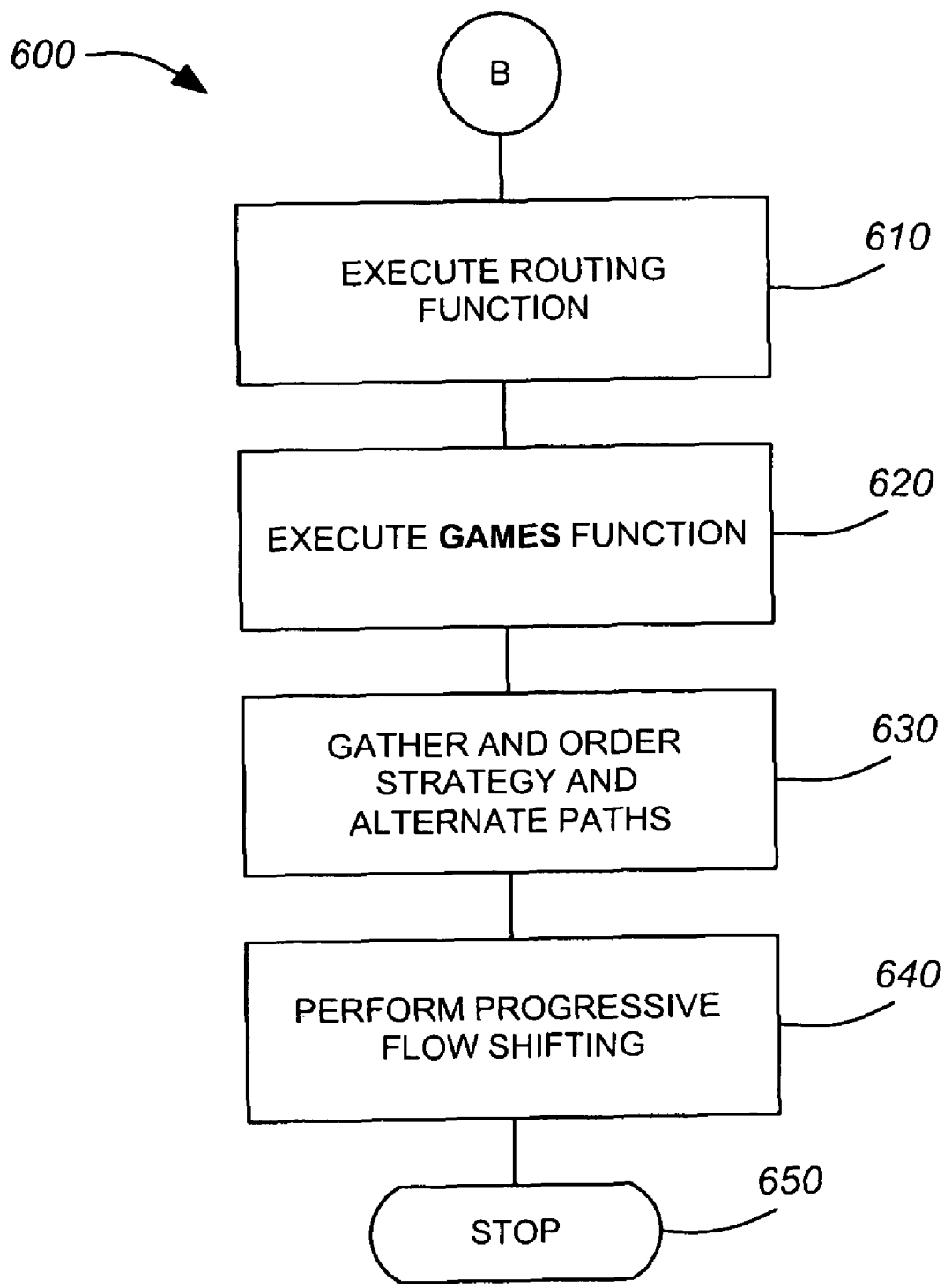
FIG. 6 is a flowchart of an exemplary embodiment of a method of calculating a back-up access solution based on criticality of a link in connection with the method of FIG. 3.

FIG. 6 is a flowchart of an exemplary embodiment of a method 600 of calculating a back-up access solution based on criticality of a link. When a determination is made that there is a critical link in step 330 of exemplary method 290, as described above with reference to FIG. 3, execution proceeds to step 610 of exemplary method 600. Thus, in various exemplary embodiments, a Link State and Application-Driven Multiple Path and/or Endpoint Strategy (LAMPES) is executed when there is a network resources shortage on a link that is used to access a Grid endpoint.

In step 610, at the source of the critical link, a link load sensitive multi-path routing function is triggered using the egress router associated with the Grid endpoint as the destination. Thus, in various exemplary embodiments, step 610 triggers execution of a Dynamic Multi-Criteria Load Balancing (DMLB) solution, which is defined for both Internet Protocol (IP) and IP/Multi-Protocol Label Switching (IP/MPLS) networks. In various exemplary embodiments, DMLB is a solution designed to prevent and minimize link congestion through network-state sensitive multi-path routing. Thus, DMLB deviates IP flows away from critical links to alternative paths by simultaneously utilizing multiple criteria gathered in a weighted vector. Accordingly, in various exemplary embodiments, the DMLB function produces a set of several Pareto-optimal, or efficient, paths.

After executing the multi-path routing function, exemplary method 600 proceeds to step 620, where a GAMES function is executed using the set of paths obtained from the routing function. In various exemplary embodiments, the GAMES function executed in step 620 is similar in functionality to the GAMES function described above with reference to FIG. 5. Accordingly, in various exemplary embodiments, given a set of Pareto-optimal paths, the GAMES function returns a strategy that includes multiple paths and/or multiple endpoints.

Exemplary method 600 then proceeds to step 630. In step 630, the strategy obtained by the GAMES function and the DMLB alternative paths to E are gathered and ordered according to Grid network and application management rules. Accordingly, in various exemplary embodiments, this step results in a strategy that includes: the initial solution, (E, P(E)); alternative solutions, $(E, P_M(E))$, where $P_M(E)$ is an alternative path to E; and/or alternative solutions, $(E_A, P(E_A))$, where $E_A$ is another Grid endpoint that provides a Pareto-optimal solution vector with respect to the application management rules.

After obtaining the strategy in step 630, exemplary method 600 proceeds to step 640, where progressive flow shifting is performed until the Grid link is no longer critical. Thus, in various exemplary embodiments, traffic is deviated away from the link contained in the initial solution towards the links specified in the back-up solution set until the Grid link's status is no longer critical. After restoring the Grid link to non-critical status, exemplary method 600 proceeds to step 650, where exemplary method 600 stops.

According to the foregoing, various exemplary embodiments compute, select, and optimize network routes between Grid user endpoints and Grid server endpoints. Various exemplary embodiments define routes according to network states, such as link capacities and traffic load, and Grid application server states, such as capacity and load. Furthermore, various exemplary embodiments compute secondary routes in the event of link or endpoint criticality or failure. Accordingly, various exemplary embodiments optimize the use of resources and links in a Grid network, while providing a back-up solution that is network state-aware.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method of selecting an access solution in a Grid network, the method comprising:
   receiving an application request, the application request having an associated application cost;
   identifying any eligible Grid endpoints for which the associated application cost is not more than an amount of available resources at each eligible Grid endpoint;
   computing, for each eligible Grid endpoint, a lowest cost path to access the eligible Grid endpoint;
   selecting, as the access solution, a most eligible Grid endpoint having a lowest cost path valued not more than the lowest cost path of all other eligible Grid endpoints; and
   when there are no eligible Grid endpoints, selecting a backup access solution in the Grid network by:
      ordering a first plurality of couples according to one or more metrics, wherein each couple includes a Grid endpoint and a path to access the Grid endpoint,
      determining a first strategy, the first strategy comprising at least one couple of the first plurality of couples for which a total amount of available resources is sufficient for execution of the application request, and
      calculating a share of resource load for each couple in the first strategy, the share of resource load specifying an amount of resources to be used at each Grid endpoint in executing the application request.

2. The method of claim 1, further comprising:
   receiving the application request from a Grid endpoint.

3. The method of claim 1, wherein:
   the associated application cost is an amount of storage required for execution of the application request, and
   the amount of available resources is an amount of free storage space at each eligible Grid endpoint.

4. The method of claim 3, further comprising:
   determining the amount of available resources by considering at least one of storage capacity, storage protocol interfaces, and storage structures at each eligible Grid endpoint.

5. The method of claim 1, wherein:
   the associated application cost is an amount of computational resources required for execution of the application request, and
   the amount of available resources is an amount of available computational resources at each eligible Grid endpoint.

6. The method of claim 1, wherein:
   the associated application cost is an amount of visualization resources required for execution of the application request, and
   the amount of available resources is an amount of available visualization resources at each eligible Grid endpoint.

7. The method of claim 1, wherein:
   the associated application cost is an amount of acquisition resources required for execution of the application request, and
   the amount of available resources is an amount of available acquisition resources at each eligible Grid endpoint.

8. The method of claim 1, wherein:
   the associated application cost is an amount of resources of a software application required for execution of the application request, and
   the amount of available resources is an amount of available resources for the software application at each eligible Grid endpoint.

9. The method of claim 1, further comprising:
   determining the lowest cost path for each of the plurality of Grid endpoints based on criteria including at least one of path length, administrative cost, bandwidth, and transit delay.

10. The method of claim 1, the method further comprising:
    distributing execution of the application request between the at least one couple in the first strategy according to the share of resource load for each couple.

11. The method of claim 1, the method further comprising:
    when a first Grid endpoint is in a critical state, shifting execution of the application request toward the at least one couple in the first strategy until the first Grid endpoint is in a non-critical state.

12. The method of claim 1, wherein the one or more metrics includes at least one of a cost of Grid resources at each Grid endpoint and a cost of each path.

13. The method of claim 1, wherein a weight is attributed to each of the one or more metrics.

14. The method of claim 1, wherein the at least one couple in the first strategy has more available resources than each of the other couples in the first plurality of couples.

15. The method of claim 1, wherein the step of calculating the share of resource load divides an amount of resources available at each couple in the first strategy by the total amount of resources available at all couples in the first strategy.

16. The method of claim 1, further comprising:
    calculating a second plurality of couples, wherein each couple includes a Grid endpoint and an efficient path to the Grid endpoint calculated using a multi-path routing function; and
    determining a second strategy by combining the at least one couple in the first strategy with the second plurality of couples.

17. The method of claim 16, further comprising:
    when a first Grid link is in a critical state, shifting execution of the application request toward the couples in the second strategy until the first Grid link is in a non-critical state.

18. An apparatus for selecting an access solution in a Grid network, the apparatus comprising:
    a receiving part that receives an application request, the application request having an associated application cost;
    a processor configured to:
       identify any eligible Grid endpoint for which the associated application cost is not more than an amount of available resources at each eligible Grid endpoint;
       compute, for each eligible Grid endpoint, a lowest cost path to access the eligible Grid endpoint;
       select, as the access solution, a most eligible Grid endpoint having a lowest cost path valued not more than the lowest cost path of all other eligible Grid endpoints; and
       select, when there are no eligible Grid endpoints, a backup access solution in the Grid network, by ordering a first plurality of couples according to one or more metrics, wherein each couple includes a Grid endpoint and a path to access the Grid endpoint, determining a first strategy, the first strategy comprising at least one couple of the first plurality of couples for which a total amount of available resources is sufficient for execution of the application request, and calculating a share of resource load for each couple in the first strategy, the share of resource load specifying an amount of resources to be used at each Grid endpoint in executing the application request.

19. The apparatus of claim 18, wherein:

the associated application cost is an amount of storage required for execution of the application request, and the amount of available resources is an amount of free storage space at each eligible Grid endpoint.

20. The apparatus of claim 19, wherein the amount of available resources is determined by considering at least one of storage capacity, storage protocol interfaces, and storage structures at each eligible Grid endpoint.

21. The apparatus of claim 18, wherein:

the associated application cost is an amount of computational resources required for execution of the application request, and the amount of available resources is an amount of available computational resources at each eligible Grid endpoint.

22. The apparatus of claim 18, wherein the lowest cost path for each eligible Grid endpoint is determined based on criteria including at least one of path length, administrative cost, bandwidth, and transit delay.

23. The apparatus of claim 22, wherein a weight is attributed to each of the criteria.

24. The apparatus of claim 18, wherein the apparatus is a network element selected from the group consisting of a user endpoint, a server endpoint, and a node.

* * * * *